United States Patent
Corbett, Jr.

[11] Patent Number: 6,113,159
[45] Date of Patent: Sep. 5, 2000

[54] PIPE GASKET WITH SHIELDED BAND

[75] Inventor: Bradford G. Corbett, Jr., Fort Worth, Tex.

[73] Assignee: S&B Technical Products, Inc., Fort Worth, Tex.

[21] Appl. No.: 09/138,227

[22] Filed: Aug. 21, 1998

[51] Int. Cl.[7] .................................................. F16L 17/00
[52] U.S. Cl. ........................ 285/345; 285/910; 264/322; 277/651
[58] Field of Search ................................... 285/345, 374, 285/910; 277/611, 616, 617, 626, 651; 23/269; 264/249, 296, 322

[56] References Cited

U.S. PATENT DOCUMENTS

| | | | |
|---|---|---|---|
| 2,210,833 | 8/1940 | Clough | 285/910 X |
| 3,315,971 | 4/1967 | Sakurada. | |
| 3,929,958 | 12/1975 | Parmann | 264/249 |
| 4,041,241 | 8/1977 | Olmstead et al. | 277/616 X |
| 4,120,521 | 10/1978 | Parmann. | |
| 4,379,559 | 4/1983 | Bohman. | |
| 4,386,045 | 5/1983 | Vaisanen | 264/249 |
| 4,602,793 | 7/1986 | Andrick | 285/345 X |
| 4,614,371 | 9/1986 | Bauder | 277/626 X |
| 4,666,165 | 5/1987 | Nordin. | |
| 4,690,414 | 9/1987 | Haaland. | |
| 4,818,209 | 4/1989 | Petersson et al. | 277/626 X |

*Primary Examiner*—Terry Lee Melius
*Assistant Examiner*—Greg Binda
*Attorney, Agent, or Firm*—Charles D. Gunter; Felsman, Bradley, Vaden, Gunter & Dillon, L.L.P.

[57] ABSTRACT

A pipe sealing gasket is shown which is designed to be received within a groove provided within a socket end of a thermoplastic pipe. The gasket has a ring shaped body of an elastomeric material and includes a metal reinforcing band. The metal reinforcing band has an angular profile, when viewed in cross-section, with an apex which is embedded within the gasket body but lies in close proximity to an exterior surface of the gasket. The apex provides a reinforced contact point during belling operations but is isolated from surrounding liquids passing through a pipe joint.

12 Claims, 2 Drawing Sheets

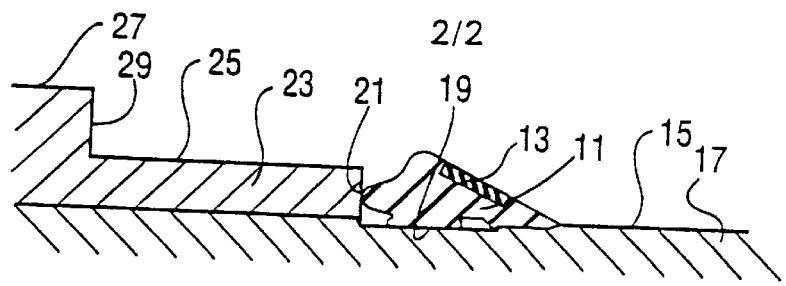
(PRIOR ART) FIG. 4
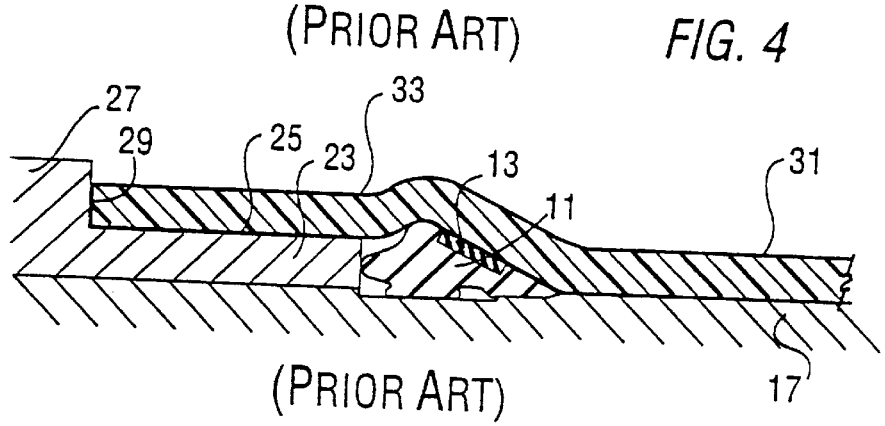
(PRIOR ART) FIG. 5
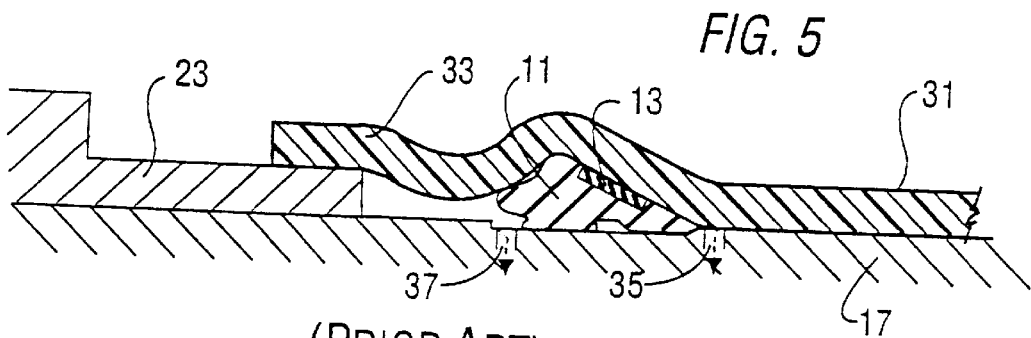
(PRIOR ART) FIG. 6
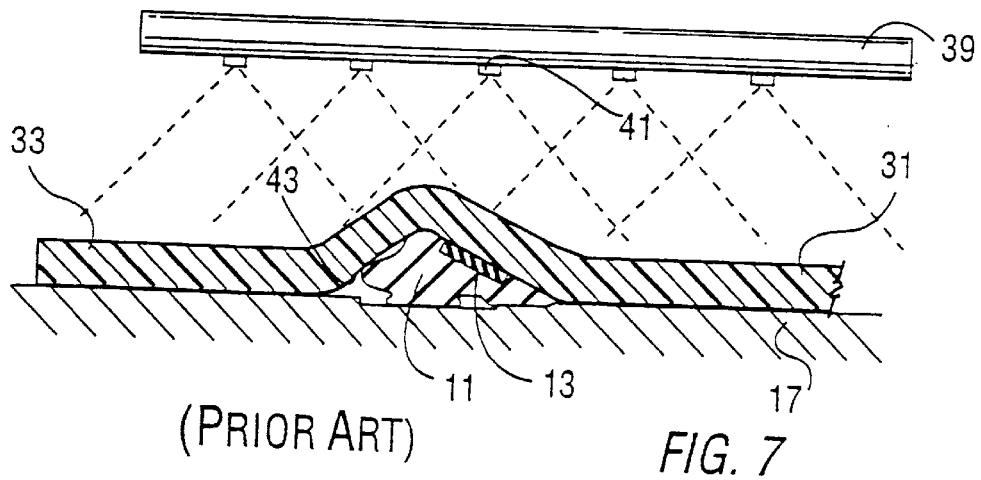
(PRIOR ART) FIG. 7

PIPE GASKET WITH SHIELDED BAND

BACKGROUND OF THE INVENTION

1. Field of the Invention

The present invention relates generally to sealing gaskets used for pipe joints in which a male spigot pipe section is installed within a mating female socket pipe section.

2. Description of the Prior Art

Pipes formed from thermoplastic materials including polyethylene polypropylene and PVC are used in a variety of industries. In forming a joint between sections of pipe, the spigot or male pipe end is inserted within the female or socket pipe end. An annular, elastomeric ring or gasket is typically seated within a grove formed in the socket end of the thermoplastic pipe. As the spigot is inserted within the socket, the gasket provides the major seal capacity for the joint. It is critical, during the installation process, that the gasket not be able to twist or flip since a displaced or dislocated gasket will adversely affect the ultimate sealing capacity of the joint.

Irrespective of the type of sealing action of the sealing element, such as compression sealing action, lip sealing action or a combination thereof, it is necessary that the sealing gasket consists of a relatively soft elastomeric material. However, a sealing ring which is formed entirely of a material which is sufficiently soft and elastomeric to provide the sealing function has the disadvantage that it is difficult to retain in the desired position in a groove in connection with the joining of sections of pipe. There is also the risk that such a sealing ring will be displaced from its sealing position in the pipe joint if the difference of the internal or external pressures on either side of the sealing ring are sufficiently great.

In the early 1970's, a new technology was developed by Rieber & Son of Bergen, Norway, referred to in the industry as the "Rieber Joint." The Rieber system employed a combined mould element and sealing ring for sealing a joint between the socket end and spigot end of two cooperating pipes formed from thermoplastic materials. In the Rieber process, the elastomeric gasket was installed within a simultaneously formed internal groove in the socket end of the female pipe during the pipe belling process. The provision of a prestressed and anchored elastomeric gasket during the belling process at the pipe factory provided an improved socket end for a pipe joint with a sealing gasket which would not twist or flip or otherwise allow impurities to enter the sealing zones of the joint, thus increasing the reliability of the joint and decreasing the risk of leaks or possible failure due to abrasion. The Rieber process is described in the following issued United States patents, among others: U.S. Pat. Nos. 4,120,521; 4,061,459; 4,030,872; 3,965,715; 3,929,958; 3,887,992; 3,884,612; and 3,776,682.

It should be evident that a sealing ring of the type under consideration could be made entirely of elastically yielding material, such as rubber. Such a design would be simple and could be produced relatively easily with uncomplicated production equipment. However, as has been discussed, such sealing rings made entirely of elastically yielding material generally lack the necessary support effect to avoid being dislodged during field installation procedures and may not be suitable for use as a combined mould element, as described above.

The groove provided in the female or socket pipe end may assume various shapes. The problem of retaining the sealing rings during joining of pipes is even more important in the case where the female groove has a bottom surface which is at least partly rounded in shape. In these cases, axially directed forces can create substantial twisting within the seal ring. In order to address the above problems, different approaches have been suggested to compensate for the lack of support effect in sealing rings made of elastically yielding material. The previously mentioned U.S. Pat. No. 3,776,682 uses a separate support member to support the mould element when producing the socket end of the pipe. However, the construction is more or less unsupported as a sealing ring. U.S. Pat. No. 3,500,047 shows a design utilizing two mould element support rings connected to the sealing ring. A design featuring three separate parts complicates the manufacturing operation, however.

In other designs, the sealing ring, in addition to the elastically yieldable material, includes either an internal or external retainer ring or band which is intended to support the gasket during the manufacturing operation and/or during field installation procedures and transport.

In those designs utilizing external reinforcing bands or rings, it is possible that water, sewage waste or other contaminates could corrode metal surfaces, thereby compromising the integrity of the pipe joint.

It is an object of the present invention to provide a sealing gasket of elastically yielding material which is suitable for use as a combined mould element and sealing ring while providing a reinforced region which is entirely embedded within the elastically yielding material.

Another object of the invention is to provide a sealing gasket with an embedded steel band of unique shape which allows the band to be thinner in cross-section than previous designs.

Another object of the invention is to provide a sealing gasket with an embedded metal band which features improved adhesion of the metal to the rubber of the gasket.

Another object of the invention is to provide such a gasket with an embedded band which avoids metal to water contact in use.

Another object of the invention is to provide such a gasket design with an embedded metal band of a unique configuration which avoids metal to water contact while at the same time provides a reinforced contact point for reinforcing the gasket during the combined moulding operations.

SUMMARY OF THE INVENTION

In the pipe joint of the invention, a first pipe of thermoplastic material has a socket end including an internal annular groove and internal cylindrical surfaces on either side of the groove of substantially equal diameter. A second pipe has an insert end which is installed within the socket end of the first pipe. A sealing gasket is disposed within the groove wholly within the cylindrical surfaces concentrically between and sealingly engaging the pipe insert end and the pipe socket end. The gasket is a unitary ring formed of a body of elastically yielding material and having a rigid, circumferentially continuous band located within the gasket body. The band is a generally planar member having a centrally located apex and a pair of oppositely arranged, outwardly extending wing regions. The outwardly extending wing regions are entirely embedded within the body of elastically yielding material. Preferably, the elastically yielding material is rubber and the apex of the band is covered with at least a thin layer of rubber so that the entire band is embedded within the body of elastically yielding material.

In the method of installing a pipe gasket within a groove in a female section of thermoplastic pipe, a sealing gasket if first installed on a forming mandrel and seated against a forming collar. A section of thermoplastic pipe is heated and a mouth region thereof is forced over the previously installed gasket on the forming mandrel to thereby deform an interior surface of the heated pipe. The section of pipe is separated from the forming collar so that the heated pipe contracts about the gasket with the deformed interior surface comprising a gasket groove in the mouth opening of the pipe. The pipe is then removed with the previously installed gasket from the forming mandrel. The gasket is a unitary ring formed of a body of elastically yielding material provided with a rigid, circumferentially continuous band located within the gasket body. The band is a generally planar member having a centrally located apex and a pair of oppositely arranged, outwardly extending wing regions. The apex and outwardly extending wing regions are entirely embedded within the body of elastically yielding material. The apex of the band is located in proximity with an outer surface of the gasket body, whereby the apex provides a reinforced contact point during the steps of forming the pipe groove.

Additional objects, features and advantages will be apparent in the written description which follows.

BRIEF DESCRIPTION OF THE DRAWINGS

FIGS. 4–7 are simplified, schematic illustrations of the prior art Rieber process for installing a sealing gasket within a groove formed within the female socket end of a thermoplastic pipe.

DETAILED DESCRIPTION OF THE INVENTION

Figure 1:
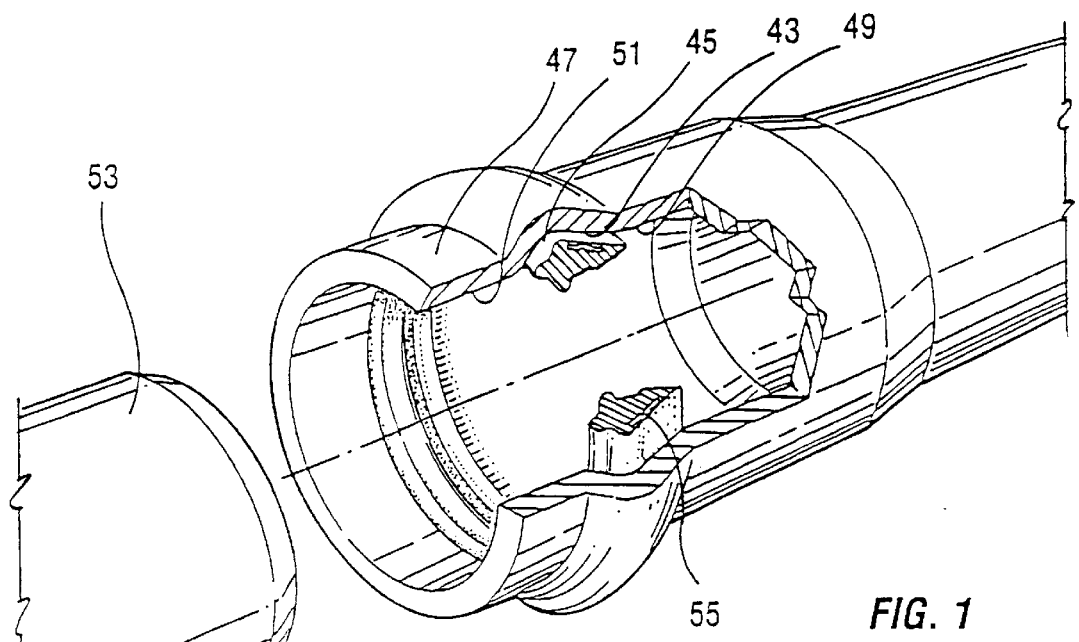
FIG. 1 is a partial, prospective view, partly broken away showing the pipe joint of the invention in which a male spigot pipe end is inserted within a female socket end, the female socket end having a groove for receiving the sealing gasket of the invention.

In order to fully appreciate the advantages provided by the pipe gasket of the invention, reference must first be had the prior art Rieber manufacturing process. Turning first to FIGS. 4–7, the Rieber process is illustrated showing the installation of a prior art compression seal gasket within the groove provided within the socket end of the female pipe section.

FIG. 4 shows an elastomeric sealing gasket 11 having an exposed reinforcing band 13, the gasket being shown installed in the generally cylindrical outer working surface 15 of the mandrel 17 used in the belling process. The elastomeric gasket 11 can be formed of, for example, rubber and is a ring shaped, circumferential member having a lower compression region 19 and an exposed nose portion 21 which, as shown in FIG. 4 abuts a back-up or forming collar 23. The forming collar 23 has a first generally cylindrical extent 25 which is a joined to a second cylindrical extent 27 by a step region 29, whereby the first extent 27 is of greater external diameter than the first cylindrical extent 25, as shown in FIG. 4.

In the prior art technique, the steel reinforced elastomeric ring 11 is placed onto the working surface of the mandrel 17 and is pushed to a position against the back-up or forming collar 23. In this position, the gasket is firmly anchored to the mandrel surface.

In the second step of the process, the socket end 33 of a thermoplastic pipe 31 is heated and pushed over the steel mandrel 17, gasket 11 and back-up collar 23. The socket end is expanded due to the thermoplastic nature of the pipe. A number of thermoplastic materials, such as polyethylene, polypropylene and polyvinyl chloride (PVC) are known in the prior art having the required expansion characteristics, depending upon the end application of the pipe joint.

The socket end 33 flows over the first cylindrical extent 25 of the back-up collar 23 and abuts the step region 29 in the second step of the process. In the next step of the process (FIG. 6) the mandrel and pipe move away from the back-up collar 23 and the pipe socket end 33 retracts around the mandrel and gasket 11 due to the elastic forces of the thermoplastic material. Typically, vacuum was also supplied through ports 35, 37 which connected the mandrel working surface with a vacuum source (not shown).

In the last step of the process (FIG. 7) the pipe socket end 33 is cooled by means of a water spray bar 39 and spray nozzles 41. As the cooling takes place, the pipe socket end 33 shrinks around the gasket 11, thus compressing the rubber body of the gasket between the steel reinforcing band 13 and the socket-groove to establish a firm seal. Since the gasket is sealed against the socket under controlled conditions at the factory, the possibility that sand or similar contaminants would penetrate the crucial sealing zone of the gasket was greatly reduced. The reinforcing metal band 13, in addition to providing the required rigidity during the manufacturing process described, also functions as a retainer to insure that the gasket is not displaced from the groove (43 in FIG. 7) during transport or installation.

The above-described Rieber process has been in commercial use since the early 1970's and is described in the above reference issued United States patents, among other sources. It will thus be well familiar to those skilled in the thermoplastic pipe sealing arts.

FIG. 1 shows a sealing gasket of the invention, designated generally as 45 which is installed within a groove 43 provided within the socket end 47 of the illustrated thermoplastic pipe. As shown in FIG. 1, the internal annular groove 43 of the socket end 47 is located between internal cylindrical surfaces 49, 51 of substantially equal diameter. The socket end 47 is intended to be made-up to form a pipe joint with the mating male or spigot pipe section 53 which is inserted within the socket end 47. The sealing gasket 45, as shown in FIG. 1, is disposed within the groove 43 wholly between the cylindrical surfaces concentrically between and sealingly engaging the pipe insert end 53 and the pipe socket end 47 (see FIG. 3) when the joint is made up.

Figure 2:
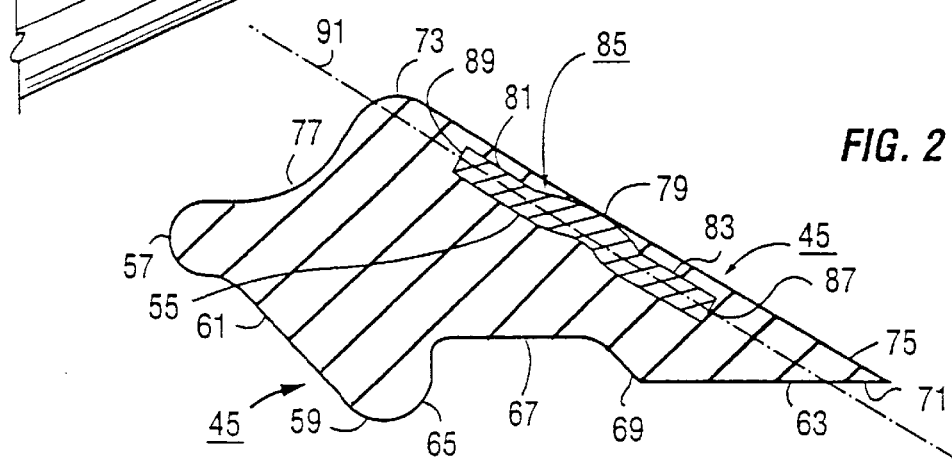
FIG. 2 is a cross-sectional view of the gasket of the invention showing the embedded band therein.

FIG. 2 shows the gasket of the invention in enlarged cross-section for ease of illustration. The gasket 45 is a unitary ring formed of a body of elastically yielding material having a rigid circumferentially continuous band 55 located within the gasket body. The gasket 45 includes a leading nose region 57 and a lower compression region 59. The leading nose region 57 is joined to the lower compression region 59 by a leading curved surface region 61. The lower compression region 59 is also joined to a secondary seal surface 63 by a trailing curved surface region 65 and an intermediate circumferential groove region 67. The groove region 67 includes an outer wall 69 which forms an obtuse angle with respect to the remainder of the groove region.

The secondary seal surface 63 is a planar circumferential region which terminates an inside corner 71 of the gasket 45.

The inside corner 71 is connected to an outer arcuate region 73 of the gasket 45 by uniformly sloping exterior gasket surface 75. The outer arcuate region 73 is connected to the nose region 57 of the gasket by a concave curved region 77.

Figure 3:
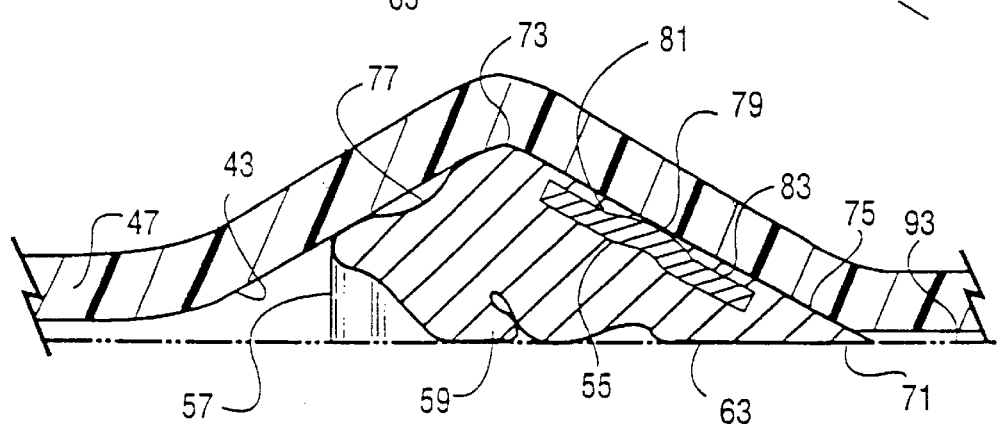
FIG. 3 is a side, cross-sectional view of the female socket end of the pipe showing the gasket of the invention in the compressed, made-up state, the male spigot end being indicated by the phantom lines.

As shown in FIGS. 2 and 3, the metal reinforcing element, in this case steel band 55, runs through the interior of the gasket about the diameter thereof. The band 55 is a generally planar member having a centrally located apex 79 and a pair of oppositely arranged, outwardly extending wing regions 81, 83. As shown in FIG. 2, the wing regions 81, 83 are entirely embedded within the body of elastically yielding material making up the remainder of the gasket. Viewed in cross-section, the wing regions 81, 83 and apex 79 give a "roof-shaped" appearance to the band. The smoothly contoured outer surfaces of the band, indicated generally at 85 in FIG. 2 present a gently sloping "ramp" which slopes upwardly from a first end 87 toward the apex 79 and then gently slopes downward to the opposite end 89 of the band 55. When viewed in cross-section, the outwardly extending wing regions 81, 83 of the band 55 are generally rectangular bodies which are bisected by an imaginary axis 91 so that they are generally aligned along a common axis with the bodies lying in a common plane. The imaginary axis 91 is approximately parallel to the uniformly sloping exterior surface 75 of the gasket 45. Preferably, the elastomeric body of the gasket 45 is formed of rubber and the apex 79 of the band 55 is covered with at least a thin layer of rubber so that the entire band is embedded within the elastomeric body of the gasket. In the preferred embodiment of the invention, the apex 79 of the band 55 is located in proximity to the uniformly sloping exterior surface 75 of the gasket body, whereby the apex provides a reinforced contact point during the belling process, as will be described in greater detail.

Referring to FIG. 1, the make-up of the pipe joint requires the insertion of the male spigot pipe section 53 within the mouth opening of the female socket end 47. As the male spigot end 53 passes over the gasket region, the compression region 59 of the sealing gasket 45 is compressed to approximately the horizontal axis 93 (FIG. 3). During the installation operation in which the male spigot end 53 is inserted within the female socket end 47, the reinforcing band 55 helps to retain the gasket 45 in position within the groove 43, thereby insuring that the gasket is not displaced or dislodged during the installation procedure.

Again with reference to the prior art belling process illustrated in FIGS. 4–7 the gasket of the invention 45 is first installed on the mandrel 17 in identical fashion to prior art gasket 11. As the heated pipe 31 flows over the gasket and is ultimately formed about the gasket, the proximity of the apex 79 of the metal band 55 to the outer surface 79 of the gasket provides a reinforced contact point during the steps of forming the pipe groove illustrated in FIGS. 6 and 7. While the gasket continues to provide a reinforced contact point to facilitate the belling operation, the metallic reinforcing element is separated by at least a thin wall of rubber from the surrounding environment. Since the pipe joints of the invention are often used in water or sewage transport systems, isolating the metallic reinforcing element prevents any possible corrosion of the element which might adversely affect the integrity of the joint.

An invention has been provided with several advantages. The gasket of the invention is simple in design and economical to manufacture. The design features a metal reinforced elastomeric body which allows it to serve as a combined mould element and sealing structure. In other words, the reinforced gasket can be placed on a forming mandrel with the heated thermoplastic pipe forced over and about the gasket to create the gasket groove during the manufacturing operation without dislodging the gasket. Additionally, the reinforcing element helps to retain the gasket in position once the belling operation is completed to insure that the gasket is not dislodged or displaced during storage, transportation or field installation. Because the reinforcing element is embedded within the elastomeric body of the gasket, it is entirely isolated from the external environment including water, sewage or other fluids flowing through the pipe joint. As such, the metal reinforcing element is not subject to corrosion or deterioration by contact with liquids.

While the invention has been shown in only one of its forms, it is not thus limited but is susceptible to various changes and modifications without departing from the spirit thereof.

What is claimed is:

1. A pipe joint, comprising:

a first pipe of thermoplastic material having a socket end including an internal annular groove and internal cylindrical surfaces on either side of the groove of substantially equal diameter;

a second pipe having an insert end which mates with the socket end of the first pipe;

a sealing gasket disposed within the groove wholly between the cylindrical surfaces concentrically between and sealingly engaging the pipe insert end and the pipe socket end, the gasket being a unitary ring formed of a body of elastically yielding material having a rigid circumferentially continuous band located within the gasket body; and wherein the band is a generally planar member having a centrally located apex and a pair of outwardly extending wing regions, the wing regions and apex, when viewed in cross-section, forming a roof-shaped profile for the band and wherein the outwardly extending wing regions are entirely embedded within the body of elastically yielding material, the apex of the band being located in proximity to an outer surface of the gasket body, whereby the apex provides a reinforced contact point during manufacture of the socket end of the pipe joint.

2. The pipe joint of claim 1, wherein the elastically yielding material is rubber and the apex of the band is covered with at least a thin layer of rubber so that the entire band is embedded within the body of elastically yielding material.

3. The pipe joint of claim 2, wherein the band is formed of metal.

4. The pipe joint of claim 1, wherein the outwardly extending wing regions of the generally planar member are generally rectangular bodies, as viewed in cross section, and are generally aligned along a common axis so that the bodies lie in a common plane, the band having a smoothly contoured outer surface which presents a gently sloping ramp which slopes upwardly from a first end of the band toward the apex and then slopes downwardly to an opposite end thereof.

5. A sealing gasket for a pipe joint, comprising:

a ring shaped elastomeric body having a substantially homogeneous composition which, when view in cross section, has a leading nose region joined to a lower compression region by a leading curved surface region, the lower compression region being joined to a secondary seal surface by a trailing curved surface region which terminates in an inside corner of the gasket body, the inside corner being connected to an outer arcuate region by a uniformly sloping exterior gasket surface, the outer arcuate region of the gasket being joined to the nose region by a concave curved region; and a rigid circumferentially continuous band located within the gasket body, the band being a generally planar member having a centrally located apex and a pair of outwardly extending wing regions and wherein the outwardly extending wing regions are entirely embedded within the elastomeric body of the gasket.

6. The sealing gasket of claim 5, wherein the elastomeric body of the gasket is formed of rubber and the apex of the band is covered with at least a thin layer of rubber so that the entire band is embedded within the elastomeric body.

7. The sealing gasket of claim 6, wherein the band is formed of metal.

8. The sealing gasket of claim 5, wherein the outwardly extending wing regions of the generally planar member are generally rectangular bodies, as viewed in cross section, and wherein the generally rectangular bodies are generally aligned along a common axis so that the bodies lie in a common plane.

9. The sealing gasket of claim 8, wherein the common axis along which the generally rectangular bodies are aligned is parallel to the uniformly sloping exterior gasket surface.

10. A method of installing a pipe gasket within a groove in a female section of thermoplastic pipe, the method comprising the steps of:

installing a sealing gasket on a forming mandrel, the gasket being seated against a forming collar;

heating a section of thermoplastic pipe and forcing a mouth opening of the section of pipe over the previously installed gasket to thereby deform an interior surface of the heated pipe;

separating the section of pipe from the forming collar and so that the heated pipe contracts about the gasket with the deformed interior surface comprising a gasket groove in the mouth opening of the pipe;

removing the pipe with the previously installed gasket from the forming mandrel; and wherein the gasket is a unitary ring formed of a body of elastically yielding material provided with a rigid circumferentially continuous band located within the gasket body, the band comprising a generally planar member having a centrally located apex and a pair of outwardly extending wing regions, the wing regions and apex, when viewed in cross-section, forming a roof-shaped profile for the band and wherein the outwardly extending wing regions are entirely embedded within the body of elastically yielding material.

11. The method of claim 10, wherein the apex of the band is located in proximity with an outer surface of the gasket body, whereby the apex provides a reinforced contact point during the steps of forming the pipe groove.

12. The method of claim 11, wherein the gasket body is formed from a substantially homogeneous composition which, when viewed in cross section, has a leading nose region joined to a lower compression region by a leading curved surface region, the lower compression region being joined to secondary seal surface by a trailing curved surface region which terminates in an inside corner of the gasket body, the inside corner being connected to an outer arcuate region by a uniformly sloping exterior gasket surface, the outer concave surface region of the gasket being joined to the nose region by a concave curved region;

wherein the outwardly extending wing regions of the generally planar member are generally rectangular bodies, as viewed in cross section, and wherein the generally rectangular bodies are generally aligned along a common axis so that the bodies lie in a common plane; and wherein the common axis along which the generally rectangular bodies are aligned is parallel to the uniformly sloping exterior gasket surface.

* * * * *